(12) United States Patent
Sasaoka (10) Patent No.: US 8,287,184 B2
(45) Date of Patent: Oct. 16, 2012

(54) FLUID PHYSICAL QUANTITY MEASURING METHOD AND CONTROL METHOD

(75) Inventor: Eisuke Sasaoka, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 725 days.

(21) Appl. No.: 12/521,100

(22) PCT Filed: Dec. 19, 2007

(86) PCT No.: PCT/JP2007/074453
§ 371 (c)(1),
(2), (4) Date: Jun. 24, 2009

(87) PCT Pub. No.: WO2008/081720
PCT Pub. Date: Jul. 10, 2008

(65) Prior Publication Data
US 2010/0027581 A1 Feb. 4, 2010

(30) Foreign Application Priority Data
Dec. 28, 2006 (JP) ................. 2006-354905

(51) Int. Cl.
*G01K 13/02* (2006.01)
*G01K 11/12* (2006.01)
*G01K 3/06* (2006.01)
(52) U.S. Cl. ............... 374/137; 374/131; 374/E11.015
(58) Field of Classification Search ............ 374/130, 374/131, 137, 141, 147, 148, E11.015, E11.016; 250/227.14
See application file for complete search history.

(56) References Cited

U.S. PATENT DOCUMENTS

| 4,738,706 A | 4/1988 | Picinelli |
| 5,308,162 A * | 5/1994 | Amano et al. ............ 374/131 |

(Continued)

FOREIGN PATENT DOCUMENTS

JP 2-134173 A 5/1990

(Continued)

OTHER PUBLICATIONS

Kazuo Notate et al., "Enlargement of measurement range by a temporal gating scheme in BOCDA fiber-optic distributed strain sensing system with time-division pump-probe generation scheme", The Institute of Electronics, Information and Communication Engineers, Technical Report of IEICE, OPE2004-224(2005-02), pp. 37-42.

*Primary Examiner* — R. A. Smith
(74) *Attorney, Agent, or Firm* — Venable LLP; Michael A. Sartori; Steven J. Schwarz (57) ABSTRACT

The present invention relates to a measuring method and a controlling method of measuring the physical quantity such as a fluid temperature distribution and the like by using an optical fiber sensing technique of BOCDA system. In the measuring method, an optical fiber that functions as a BOCDA-type optical fiber sensor is disposed along a flow direction of a fluid that flows though a pipe line and in the pipe line. Since the optical fiber directly contacts with the fluid that flows though the pipe line, it is possible to rapidly measure the fluid temperature distribution. Also, based on this measurement result, the controlling method adjusts each temperature of one or more heating/cooling means provided along the longitudinal direction of a pipe line, thereby controlling at high accuracy the fluid temperature distribution in the pipe line.

4 Claims, 4 Drawing Sheets

U.S. PATENT DOCUMENTS

| | | | |
|---|---|---|---|
| 6,200,023 B1 * | 3/2001 | Tay et al. | 374/161 |
| 7,227,123 B2 * | 6/2007 | Kwon et al. | 250/227.14 |
| 7,302,844 B2 | 12/2007 | Birkle et al. | |
| 7,430,903 B2 * | 10/2008 | Ramos | 73/204.11 |
| 7,480,460 B2 * | 1/2009 | Colpitts et al. | 398/108 |
| 7,873,273 B2 * | 1/2011 | Koyamada | 398/28 |
| 8,075,498 B2 * | 12/2011 | Leo et al. | 600/587 |
| 2003/0007142 A1 * | 1/2003 | Hotate et al. | 356/73.1 |
| 2009/0141267 A1 * | 6/2009 | Hotate et al. | 356/73.1 |

FOREIGN PATENT DOCUMENTS

| | | |
|---|---|---|
| JP | 2-171628 | 7/1990 |
| JP | 3-181829 | 8/1991 |
| JP | 3-210440 A | 9/1991 |
| JP | 06-267642 A | 9/1994 |
| JP | 6-326045 | 11/1994 |
| JP | 08-334420 | 12/1996 |
| JP | 2000-180265 | 6/2000 |
| JP | 2002-130581 | 5/2002 |
| JP | 2006-504966 | 2/2006 |

* cited by examiner

FLUID PHYSICAL QUANTITY MEASURING METHOD AND CONTROL METHOD

TECHNICAL FIELD

The present invention relates to a fluid physical-quantity measuring method and a fluid physical-quantity controlling method of measuring/controlling the physical quantity such as temperature distribution, flow rate and the like of a fluid as an object by using a BOCDA-type optical fiber sensor.

BACKGROUND ART

Conventionally, as an optical fiber sensor applied to a light sensing technology, an OTDR (Optical Time Domain Reflectrometer)-based optical fiber sensor which measures the physical quantity (such as temperature and loss) and a defect position in an optical fiber, by measuring a backscattering light caused by Rayleigh scattering which is generated while a light pulse is inputted into the optical fiber, has been known.

On the other hand, the shape of Brillouin gain spectrum (BGS) of Brillouin scattering light outputted from an optical fiber changes due to temperature and/or strain of the optical fiber. As a technology measuring the physical quantity of an object by using this change, a BOCDA (Brillouin Optical Correlation Domain Analysis)-type optical fiber sensor which has been described in, for example, patent document 1 and non-patent document 1 has been conventionally known.
Patent document 1: Japanese Patent Laid-Open Publication No. 2000-180265
Non-patent document 1: Kazuo Hotate, and Hiroshi Arai, "Enlargement of Measurement Range by a Temporal Gating Scheme in BOCDA Fiber-Optic Distributed Strain Sensing System with Time-Division Pump-Probe Generation Scheme", IEICE Technical Report, The Institute of Electronics, Information and Communication Engineers, OPE2004-224 (2005-02)

DISCLOSURE OF THE INVENTION

Problems that the Invention is to Solve

The inventors have studied the conventional optical fiber sensor in detail, and as a result, have found problems as follows.

Namely, there has been a request for measuring rapidly and accurately the physical quantity such as temperature distribution and flow rate of a fluid that exists inside a pipe line or a container. However, it has been difficult to achieve the satisfactory measuring performance, about the spatial resolution and measuring time in physical quantity measurement of a fluid being an object to be measured, in a conventional OTDR-type optical fiber sensor.

Here, in accordance with the technology disclosed in the above-described patent document 1, non-patent document 1 and the like, pumping light and probe light are inputted oppositely from both ends of an optical fiber corresponding to the sensor portion. At this time, the frequency modulation of the pumping light and probe light induces Brillouin scattering at a desired position in the longitudinal direction of the optical fiber. Temperature distribution along the longitudinal direction of the optical fiber is measured by measuring a gain spectrum resulting from this Brillouin scattering (BGS).

In accordance with such an optical fiber sensor with a fiber-optic distributed strain sensing technology (BOCDA-type), by a continuous lightwave correlation control method, in which Brillouin scattering method has been adopted, in comparison with the optical fiber sensing with Raman scattering method or the like that has been conventionally known, the superior effects in various characteristics such as a measured temperature range, the spatial resolution of the temperature distribution measurement in the longitudinal direction, measuring time, and the like can be expected.

For example, a BOCDA-type optical fiber sensor can maintain a sufficient level of the intensity (gain) of Stokes light even at a very low temperature. Furthermore, because a BOCDA-type optical fiber sensor measures temperature by frequency shift, it is confirmed that the optical fiber sensor has better in noise tolerance than that in optical fiber sensing with Raman scattering method in which temperature is measured based on the light intensity ratio, and can measure down to the absolute temperature 1 K.

The spatial resolution $\Delta z_r$ of a BOCDA-type optical fiber sensor is expressed by the following expression (1), $$\Delta Z_r = \frac{\Delta v_B}{f_m} \frac{v_g}{2\pi m f_m} \qquad (1)$$

where $mf_m$ and $f_m$ respectively are an amplitude and modulation-frequency of the sinusoidal-wave-shaped frequency-modulation that is applied to a light source, $\Delta v_B$ is a BGS line width, and $v_g$ is a group velocity of light.

To give one example, about a typical optical fiber with a group velocity of $2.0 \times 10^8$ m/s and a BGS line width of 50 MHz, when using a frequency-modulation amplitude 2 GHz and modulation-frequency 100 MHz which can be realized by an existing laser diode (LD), the spatial resolution along the longitudinal direction of the optical fiber becomes approximately 1 cm.

Also, because continuous light is used in a BOCDA-type optical fiber sensor, OSNR (optical signal-to-noise intensity ratio) is better than that of a pulse method, and furthermore, there is no need for integrating or averaging an optical signal. Thus, it has been confirmed that it is possible to perform, at a high speed, a temperature distribution measurement and the like, and it is possible to measure at 57 Hz per measurement point.

Furthermore, a BOCDA-type optical fiber sensor can adjust freely the spatial resolution, measuring range, and measuring time of the temperature distribution measurement along the longitudinal direction of an optical fiber, according to the characteristics of an object to be measured and the like, by adjusting a frequency-modulation pattern of pumping light and probe light. Also, a BOCDA-type optical fiber sensor can adjust freely sampling intervals in addition to spatial resolution.

The present invention is made to solve the aforementioned problem, and it is an object to provide a fluid physical-quantity measuring method and a fluid physical-quantity controlling method of measuring/controlling at a high speed and a high accuracy the physical quantity such as temperature distribution, flow rate, and the like of the fluid, without limiting the shape of a container or the like through which a fluid flows, by using an optical fiber sensing technology of BOCDA system that has excellent characteristics.

Means for Solving the Problems

In order to achieve the above-described objective, in a fluid physical-quantity measuring method and controlling method according to the present invention, the temperature distribution of a fluid that flows through a pipe line is measured by using a BOCDA-type optical fiber sensor, and the temperature distribution of the fluid is controlled by adjusting the temperature of one or more heating/cooling means provided along the longitudinal direction of the pipe line.

Specifically, in the measuring method of measuring the temperature distribution of a fluid that flows through a pipe line, an optical fiber, whose at least part is disposed in the pipe line along the flow direction of the fluid as an object, is prepared. Pumping light is inputted from one end of this optical fiber, and probe light is inputted from the other end of the optical fiber (the opposite incidence of pumping light and probe light). Then, the frequencies of the pumping light and probe light inputted oppositely from both ends of the optical fiber are modulated, and thereby a BGS generated at a desired position in the longitudinal direction of the optical fiber is measured. Thus, as the temperature distribution of the fluid in the pipe line, the temperature distribution along the longitudinal direction of a portion (sensor portion) of the optical fiber which is located in the pipe line is determined.

On the other hand, in the controlling method of controlling the temperature distribution of a fluid that flows through the pipe line, each respective temperature of one or more heating/cooling means provided in the pipe line is adjusted such that the temperature distribution of the fluid in the pipe line becomes a predetermined distribution pattern, on the basis of the measurement result of the fluid temperature distribution in the pipe line that is measured as described above. In this specification, the wording "predetermined distribution pattern" means as a temperature distribution pattern determined before it changes temporally or spatially.

Also, in a fluid physical-quantity measuring method and controlling method according to the present invention, the temperature distribution of a fluid contained in a container with any shape is measured by using a BOCDA-type optical fiber sensor, and the temperature distribution of the fluid is controlled by adjusting the temperature of one or more heating/cooling means provided to the container.

Specifically, in the measuring method of measuring the temperature distribution of a fluid inside a container, an optical fiber, whose at least part is disposed two-dimensionally or three-dimensionally in the container, is prepared. Pumping light is inputted from one end of this optical fiber, and probe light is inputted from the other end of the optical fiber (the opposite incidence of pumping light and probe light). Then, the frequencies of the pumping light and probe light inputted oppositely from both ends of the optical fiber are modulated, and thereby the BGS generated at a desired position in the longitudinal direction of the optical fiber is measured. Thus, as the temperature distribution of the fluid in the container, the temperature distribution along the longitudinal direction of a portion (sensor portion) of the optical fiber which is located in the container is determined.

On the other hand, in the controlling method of controlling the temperature distribution of a fluid in the container, the respective temperature of one or more heating/cooling means provided for the container is adjusted such that the temperature distribution of the fluid in the container becomes a predetermined distribution pattern, on the basis of the measurement result of the fluid temperature distribution in the container that is measured as described above.

Furthermore, in a fluid physical-quantity measuring method and controlling method according to the present invention, the flow rate of a fluid that flows through the pipe line is measured by using a BOCDA-type optical fiber sensor, and the flow rate of the fluid is controlled by adjusting a flow volume adjusting means which is provided in the pipe line for adjusting the flow rate of the fluid.

Specifically, in the measuring method of measuring the flow rate of a fluid that flows through a pipe line, an optical fiber, whose at least part is disposed along the flow direction of the fluid in the pipe line, is prepared. Pumping light is inputted from one end of this optical fiber, and probe light is inputted from the other end of the optical fiber (the opposite incidence of pumping light and probe light). Then, the frequencies of the pumping light and probe light inputted oppositely from both ends of the optical fiber are modulated, and thereby the BGS generated at a desired position in the longitudinal direction of the optical fiber is measured. Thus, on the basis of the measurement result of temperature distribution along the longitudinal direction of a portion (sensor portion) of the optical fiber, which is located in the pipe line, and temporal change of the temperature distribution, the flow rate of the fluid that flows through the pipe line is determined.

On the other hand, in the controlling method of controlling the flow rate of a fluid that flows through a pipe line, a flow volume adjusting means is controlled such that the flow rate of the fluid within the pipe line approaches a predetermined value, on the basis of the measurement result of temperature distribution along the longitudinal direction of a portion (sensor portion) of the optical fiber, which is located in the pipe line, and temporal change of the temperature distribution, as above described.

In a fluid physical-quantity measuring method and controlling method according to the present invention, the sampling interval and spatial resolution of the temperature distribution measurement along the longitudinal direction of an optical fiber, the range of the temperature distribution measurement, and the execution time of the temperature distribution measurement are preferably set by the frequency-modulation pattern of pumping light and probe light being adjusted in accordance with the kind of the fluid which is an object to be measured.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

Effects of the Invention

As described above, in accordance with the present invention, an optical fiber sensing technology of BOCDA system that measures the temperature distribution along the longitudinal direction of an optical fiber, with Brillouin scattering, at a high accuracy and in a short time is used. At this time, the optical fiber of the sensor portion is provided inside a pipe line or a container and directly contacts with a fluid as an object to be measured. By such a configuration, the temperature distribution and flow rate of the fluid inside the pipe line or the container can be measured at a high accuracy and in a short time.

Also, the temperature distribution and flow rate of a fluid can be controlled at a high accuracy and at a high speed, by adjusting appropriately heating/cooling means, a flow volume adjusting means, and the like, based on the obtained measurement result.

Furthermore, the present invention can make full use of the optical fiber characteristics such as, in addition to having lightness, smallness of diameter, and explosion prevention, not being subject to and not causing electromagnetic noise, and the like. Thus, many advantages such as being able to widely apply it to the measurement/control of an object to be measured which requires these characteristics of an optical fiber, and the like are achieved.

DESCRIPTION OF THE REFERENCE NUMERALS

1: pipe line; 2, 2a, 2b: fluid; 3: temperature measuring optical fiber; 4a, 4b: feedthrough optical fiber; and 5: BOCDA-type temperature sensor body.

BEST MODES FOR CARRYING OUT THE INVENTION

In the following, embodiments of a fluid physical-quantity measuring method and controlling method according to the present invention will be explained in detail with reference to FIGS. 1 to 4. In the explanation of the drawings, constituents identical to each other will be referred to with numerals identical to each other without repeating their overlapping descriptions.

Figure 1:
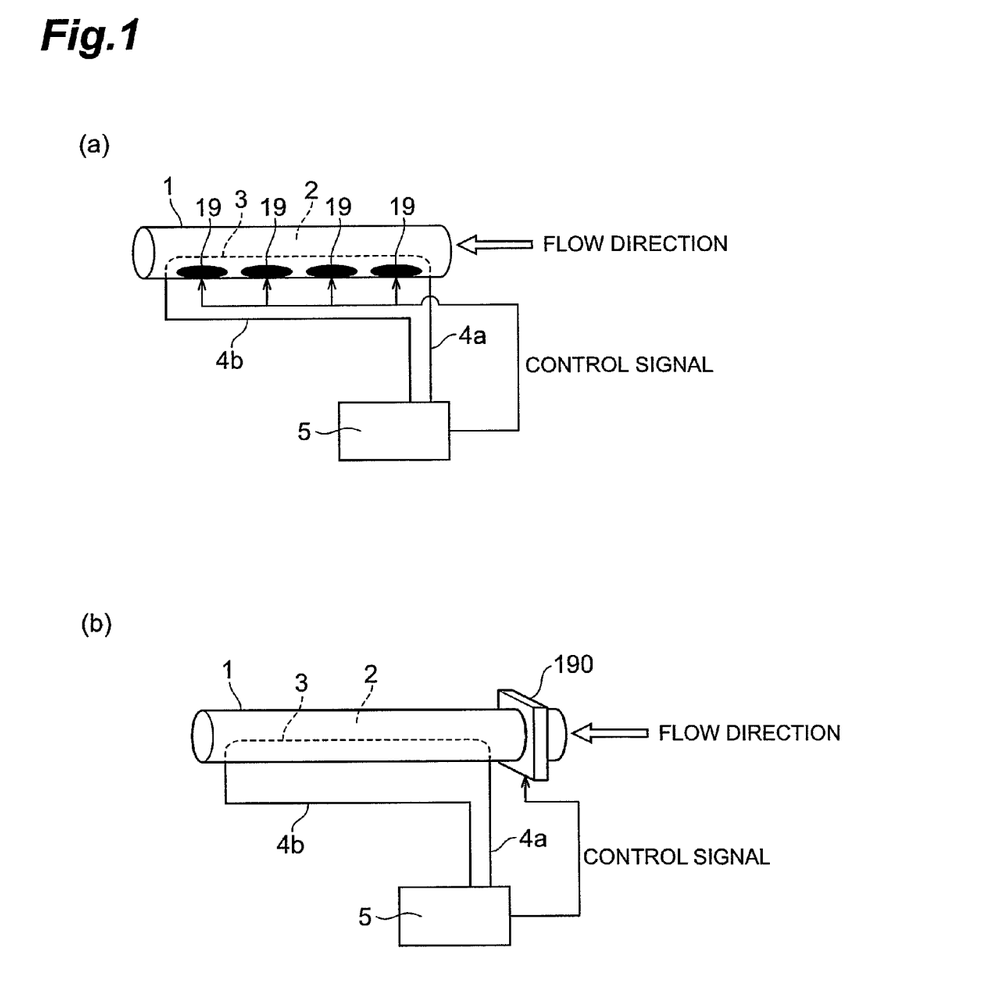
FIG. 1 is a view showing a schematic configuration of a BOCDA-type optical fiber sensor that realizes a fluid physical-quantity measuring method and controlling method according to the present invention.

FIG. 1 is a view showing a schematic configuration of a BOCDA-type optical fiber sensor that realizes a fluid physical-quantity measuring method and controlling method according to the present invention. Particularly, in FIG. 1, the area (a) shows a configuration example of an optical fiber sensor capable of measuring/controlling the temperature distribution as the physical quantity of a fluid, and the area (b) shows a configuration example of an optical fiber sensor capable of measuring/controlling the flow rate as the physical quantity of a fluid. In addition, as shown in FIG. 1, a fluid 2 as an object to be measured flows in an arrow direction at a predetermined flow rate within a pipe line.

An optical fiber sensor, shown in the area (a) of FIG. 1, comprises a temperature sensor body 5, an optical fiber 3 (sensor portion), feedthrough optical fibers 4a and 4b, and one or more heating/cooling means 19.

In such an optical fiber sensor (the area (a) of FIG. 1), the optical fiber 3 is disposed along the flow direction of the fluid 2 in the pipe line 1, so as to measure/control the temperature distribution of the fluid 2 that flows along the arrow direction in the pipe line 1. Also, the heating/cooling means 19 are disposed along the flow direction of the fluid 2 in the pipe line 1. One end of each of the feedthrough optical fibers 4a and 4b is connected to both ends of the optical fiber 3. These feedthrough optical fibers 4a and 4b penetrate the wall surface of the pipe line 1 and are located outside it, and by connecting the other ends thereof to the temperature sensor body 5, the optical fiber 3 and the temperature sensor body 5 are coupled optically to each other.

By the above configuration, the optical fiber 3 functions as a BOCDA-type optical fiber sensor (a fiber-optic distributed sensing technology with Brillouin scattering method, by a continuous lightwave correlation control method). Also, a control signal is transmitted from the temperature sensor body 5 to the heating/cooling means 19 such that the temperature distribution of the fluid 2 in the pipe line 1 becomes a predetermined distribution pattern, on the basis of the obtained measurement result of the temperature distribution of the fluid 2 in the pipe line 1. Thus, the temperature sensor body 5 controls the temperature of each of the heating/cooling means 19.

On the other hand, an optical fiber sensor shown in the area (b) of FIG. 1 comprises the temperature sensor body 5, the optical fiber 3 (sensor portion), the feedthrough optical fibers 4a and 4b, and a flow volume adjusting means 190.

In such an optical fiber sensor (the area (b) of FIG. 1), the optical fiber 3 is disposed along the flow direction of the fluid 2 in the pipe line 1, so as to measure/control the flow rate of the fluid 2 that flows along the arrow direction in the pipe line 1. Also, the flow volume adjusting means 190 is attached to the pipe line 1. One end of each of the feedthrough optical fibers 4a and 4b is connected to both ends of the optical fiber 3. These feedthrough optical fibers 4a and 4b penetrate the wall surface of the pipe line 1 and are located outside it, and by connecting the other ends thereof to the temperature sensor body 5, the optical fiber 3 and the temperature sensor body 5 are coupled optically to each other.

By the above configuration, the optical fiber 3 functions as a BOCDA-type optical fiber sensor (a fiber-optic distributed sensing technology with Brillouin scattering method, by a continuous light wave correlation control method). Also, the flow volume adjusting means 190 is controlled such that the flow rate of the fluid 2 which flows through the pipe line 1 approaches a predetermined value, on the basis of the obtained measurement result of the temperature distribution of the fluid 2 in the pipe line 1 and the temporal change of the measured temperature distribution. Thus, the temperature sensor body 5 controls the flow rate of the fluid 2 which flows through the pipe line 1.

Figure 2:
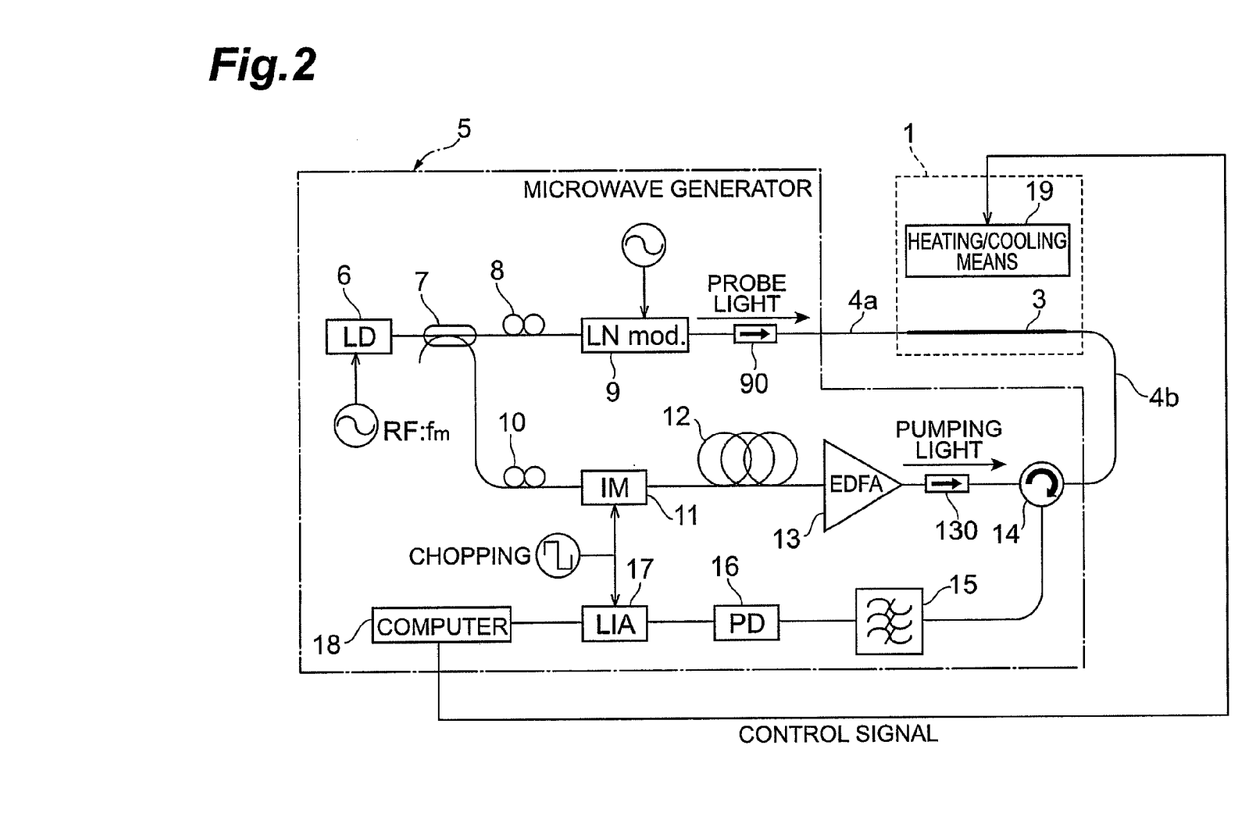
FIG. 2 is a view showing a configuration example of the BOCDA-type optical fiber sensor.

The temperature sensor body 5 of a BOCDA-type optical fiber sensor is configured as shown in FIG. 2. Namely, the temperature sensor body 5 comprises a laser diode (LD) 6 as a light source, and in addition comprises a probe light generating system, a pumping light generating system, and a measuring system. The probe light generating system comprises a 3 dB coupler 7, a polarization controller 8, a phase modulator (LN mod.) 9 that is controlled by a microwave generator, and an isolator 90. The pumping light generating system comprises the 3 dB coupler 7, a polarization controller 10, an intensity modulator (IM) 11, a delay line 12, an optical fiber amplifier (EDFA) 13, an isolator 130, and a circulator 14. The measuring system comprises the circulator 14, an optical filter 15, a photodiode 16, a lock-in amplifier (LIA) 17, and a control unit (computer) 18.

First, the light outputted from the LD 6 is divided into two lightwave components at the 3 dB coupler 7. One light is shifted in frequency by approximately 11 GHz at the phase modulator (LN mod.) 9, after passing through the polarization controller (PC) 8. The frequency-shifted light passes through the isolator 90 and the optical fiber 4a for connection in this order as probe light, and is inputted to the one end of the optical fiber 3 (sensor portion). The other light is amplified in the optical fiber amplifier (EDFA) 13, after passing through the polarization controller 10, the intensity modulator (IM) 11 and the delay line 12. This amplified light passes through the isolator 130 and the optical fiber 4b for connection in this order as pumping light, and is inputted to the other end of the optical fiber 3. In this manner, the pumping light and probe light pass oppositely through the optical fiber 3, and stimulated Brillouin scattering (SBS) is induced. At this time, the probe light is amplified by only the gain corresponding to a gain spectrum (BGS) of Stokes light. The amplified probe light is guided into the optical filter 15 through the circulator 14. After eliminating the unnecessary light component by the optical filter 15, BGS is detected from the probe light by the photodiode (PD) 16, the lock-in amplifier (LIA) 17, and the like. The control unit 18 (computer) measures the temperature distribution of an object, and in addition controls the heating/cooling means 19 (output of control-signal), on the basis of this BGS detection result. Incidentally, even in the configuration in which the flow volume adjusting means 190 is disposed in the pipe line 1, the flow volume adjusting means 190 is controlled, on the basis of a control signal outputted from the control unit 18.

In the above-described BOCDA-type optical fiber sensor, the frequencies of pumping light and probe light are modulated by changing an injection current to the LD 6, into sinusoidal-wave-shaped one. On this account, in the longitudinal direction of the optical fiber 3, a high-correlation position (correlation peak) and low-correlation position in which the frequency difference between pumping light and probe light is constant are generated, and large SBS is generated only in the correlation peak.

As a result, BGS information of Stokes light can be obtained at a specific position, and by changing in sequence the frequency modulation pattern of pumping light and probe light, it is possible to measure at a high accuracy and in a short time the temperature distribution of the fluid 2 that flows through the pipe line 1.

The thus obtained temperature distribution data of the fluid 2 inside the pipe line 1 is stored in the computer 18 that is configured by a personal computer and the like. On the other hand, the heating/cooling means 19 are arranged outside or inside the pipe line 1 and at a predetermined interval along the longitudinal direction of the pipe line 1, and the temperature of each of the heating/cooling means 19 is adjusted by a control signal (instruction) from the computer 18. The computer 18 stores in advance an ideal temperature distribution data (basic data) of the fluid 2 that flows through the pipe line 1, and operates the heating/cooling means 19 arranged at the position where the tolerable range of the basic data is not satisfied, by comparing the stored basic data and the temperature distribution data measured by the optical fiber 3 (temperature adjustment). In this manner, the computer 18 controls the temperature distribution of the fluid 2 inside the pipe line 1.

Here, a BOCDA-type optical fiber sensor can adjust freely the sampling interval, measuring range, measuring time, and the like, along the longitudinal direction of the optical fiber 3, by adjusting the frequency-modulation pattern of pumping light and probe light. In other words, it is important that fineness and spread regarding position, of the temperature distribution variation of an object, and the speed of the temperature change, correspond to the sampling interval, measuring range, and measuring time along the longitudinal direction of the optical fiber 3 by an optical fiber sensor, in order to accurately grasp the temporal change and two-dimensional distribution of the temperature distribution. In addition, it is impossible to perform a meaningful measurement even when a sampling interval is set shorter than the spatial resolution of an optical fiber sensor.

For example, an object to be measured is a fluid that flows at a flow rate (v) of 1 m/s inside the pipe line with a length of 10 m, and then, in the case of measuring the temperature distribution of the fluid, the measurement range of the optical fiber sensor is preferably 10 m or more. Also, when the sampling interval (dz) in the longitudinal direction of an optical fiber sensor is 0.1 m, the time required for a fluid to flow through the length corresponding to the sampling interval (dz) is 0.1 sec. It is necessary that measuring time (dt) is 0.1 sec or less in order to measure such a fluid. A general expression that expresses this matter is the following expression (2).

$$dt \leq dz/v \qquad (2)$$

The temperature distribution measurement of the specification as described above, that is, a measuring range of 10 m or more, the spatial resolution of 0.1 m or less in longitudinal direction of the optical fiber 3, and the measuring time of 0.1 sec or less is a sufficiently feasible level by an optical sensing technology of BOCDA system that is configured as described above. In concrete terms, the measuring time at each measuring point can be 0.1 sec, in the conditions that the optical fiber 3 with the length of 10 m is used as sensor portion, the spatial resolution in the longitudinal direction of the optical fiber 3 is 0.1 m, and the number of measuring positions (measuring points) is 100.

The application of the present invention includes, for example, the case of desiring to control at desired temperatures the temperature at the inlet, the temperature at the outlet, the temperature of the entire region from the inlet to the outlet, and the like of a liquid or gas that flows through the pipe line. Also, the setting number of and the setting places of heating/cooling means are selected appropriately in accordance with those applications.

Figure 3:
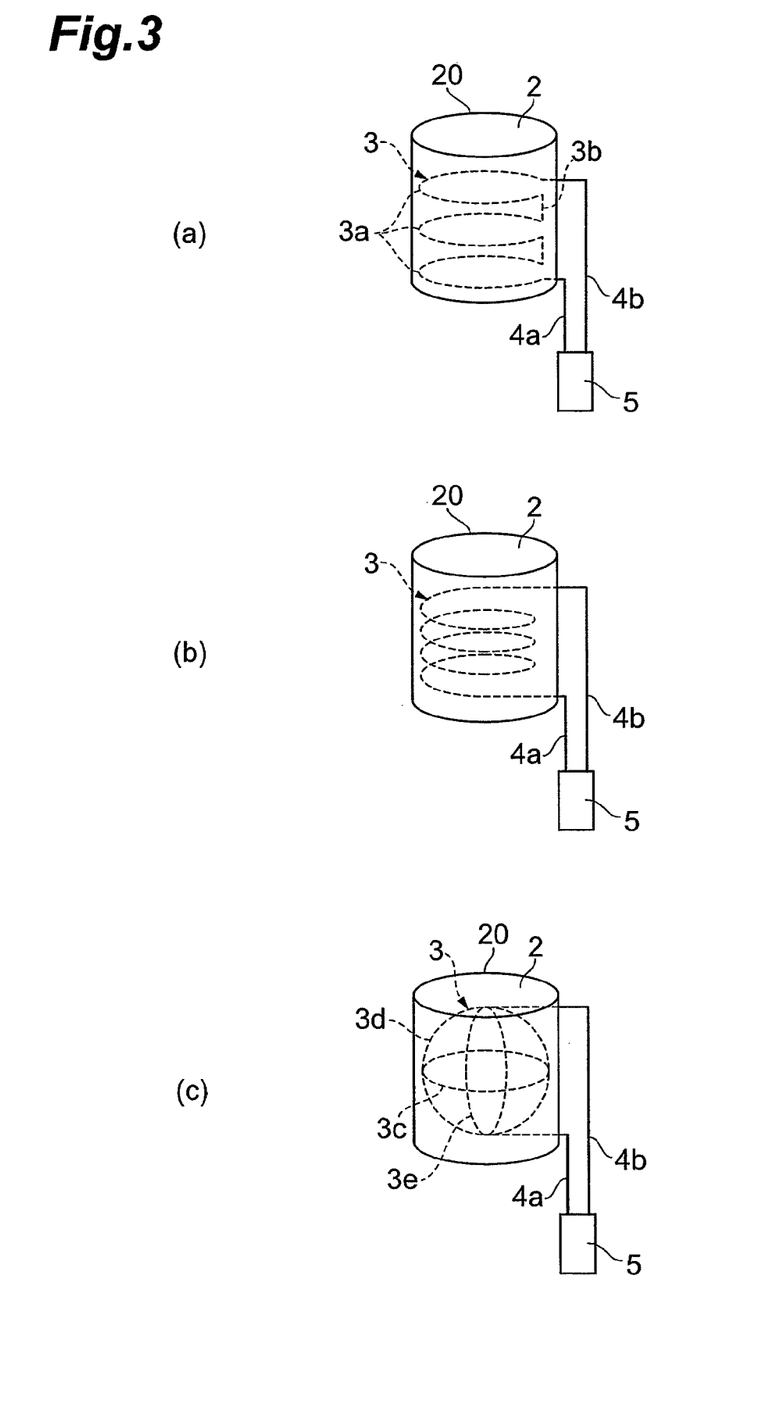
FIG. 3 is a view showing an example of three-dimensional arrangement of, the BOCDA-type optical fiber sensor that realizes a fluid physical-quantity measuring method according to the present invention, and particularly an optical fiber that serves as a sensor portion.

Next, FIG. 3 is a view showing an example of three-dimensional arrangement of, a BOCDA-type optical fiber sensor that realizes a fluid physical-quantity measuring method according to the present invention, and particularly the optical fiber 3 that serves as a sensor portion. As shown in this FIG. 3, when an object to be measured is a fluid 2 contained inside a container 20, the optical fiber 3 is arranged two-dimensionally or three-dimensionally inside the container 20.

First, in an arrangement example shown in the area (a) of FIG. 3, circular parts 3a along the inner circumference of the container 20 are provided in multistage in the height direction of the container, while the optical fiber 3 is deformed partially such that these circular parts 3a are joined with line-shaped parts 3b along the height direction of the container 20. One ends of the feedthrough optical fibers 4a and 4b are connected to both ends of the optical fiber 3. These feedthrough optical fibers 4a and 4b penetrate the wall surface of the container 20 and are located outside it. Also, the other ends of these feedthrough optical fibers 4a and 4b connect to the temperature sensor body 5, and the optical fiber 3 (including the circular parts 3a and the line-shaped parts 3b) functions as a BOCDA-type optical fiber sensor.

Also, in an arrangement example shown in the area (a) of this FIG. 3, heating/cooling means (see the area (a) in FIG. 1) at one or appropriately more places outside or inside the container 20 are arranged. In this configuration, a control unit 18 can adjust the temperature of each of the heating/cooling means.

The control unit 18 stores in advance the ideal temperature distribution data (basic data) of the fluid 2 in the container 20.

In comparison with the temperature distribution data measured by the optical fiber 3 (including the circular parts 3a and the line-shaped parts 3b) and the basic data, when the temperature distribution data is out of the tolerable range of the basic data, the appropriate heating/cooling means is operated timely (temperature adjustment). Thus, the temperature distribution of the fluid 2 inside the container 20 is controlled.

The areas (b) and (c) of FIG. 3 show variations of arrangement configuration of the optical fiber 3. For example, in the arrangement example shown in the area (b) of FIG. 3, one ends of the feedthrough optical fibers 4a and 4b is connected to both ends of the optical fiber 3 arranged in spiral shape along the inner circumference of and the height direction of the container 20. Also, in the arrangement example shown in the area (c), the optical fiber 3 is partially deformed so as to have a latitude line shaped part 3c placed in a center part of a virtual spherical body, and two orthogonal longitude line shaped parts 3d and 3e that are placed to pass through the top and bottom points of the virtual spherical body in the interior space of the container 20. In addition, one end of each of the feedthrough optical fibers 4a and 4b is connected to both ends of the thus deformed optical fiber 3.

Incidentally, regarding the arrangement example shown in FIG. 3, the arrangement configuration of the optical fiber 3 is not limited to arrangement examples as shown in the figures. For example, two-dimensional or three-dimensional, various arrangement configurations can be adopted, according to the shape of a container and the characteristics of an object to be measured.

The application of such a temperature distribution measurement includes, for example, the case of desiring to hold the temperature of a liquid or gas contained in a container, constant throughout the container interior portion, and to cause a temperature difference with a desired pattern. For example, the measurement is preferably used for the case sensitive to the environmental temperature, such as causing the crystal growth, and the desired chemical reaction and fermentation in a container, and the like, and for the process that for itself causes a change in temperature. Incidentally, the setting number of and the setting places of heating/cooling means can be selected appropriately in accordance with those applications.

Figure 4:
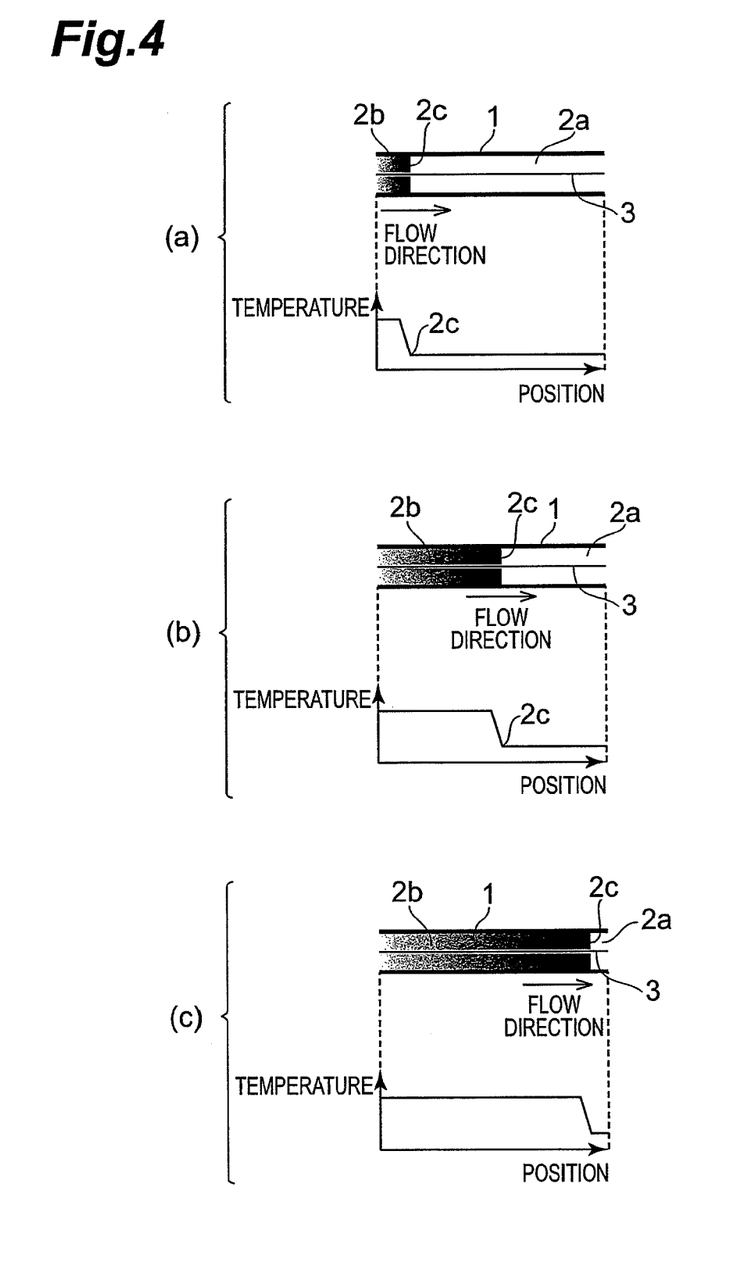
FIG. 4 is a view for explaining the flow rate measurement by a fluid physical-quantity measuring method according to the present invention.

FIG. 4 is a view for explaining the flow rate measurement by a fluid physical-quantity measuring method according to the present invention. The flow rate measurement and control as shown in FIG. 4 are performed by the BOCDA-type optical fiber sensor, which is shown in the area (b), comprising the optical fiber (sensor portion) 3, the feedthrough optical fibers 4a and 4b, the temperature sensor body 5, and the flow volume adjusting means 190 arranged inside the pipe line 1. Incidentally, FIG. 4 shows the state in which a temperature boundary 2c of the fluid 2 moves along its flow direction, the area (a) shows the temperature boundary after one second from the measurement start and the temperature distribution measurement result at that time, the area (b) shows the temperature boundary after two seconds from the measurement start and the temperature distribution measurement result at that time, and the area (c) shows the temperature boundary after three seconds from the measurement start and the temperature distribution measurement result at that time.

In other words, a low-temperature fluid (for example, cold water) 2a is filled in the pipe line 1 in advance, and a high-temperature fluid (for example, hot water) 2b is poured from the inlet side into this pipe line 1. In this case, immediately after the high-temperature fluid 2b is introduced (after one second from the measurement start), as shown in the area (a) of FIG. 4, the BOCDA-type optical fiber sensor measures the temperature distribution of a fluid that flows through the pipe line 1, thereby specifying the temperature boundary 2c of the fluids 2a and 2b that are different in temperature from each other. Thereafter, by measuring the movement of the temperature boundary 2c of the fluids 2a and 2b per predetermined time interval with the optical fiber 3 (see the areas (b) and (c) in FIG. 4), the flow rate of the high-temperature fluid 2b is measured.

On the other hand, the control unit 18 (see FIG. 2) stores the ideal temporal temperature-change data (basic data) of the high-temperature fluid 2b. The control unit 18 compares the flow rate data measured by the optical fiber 3 with the basic data, and when the flow rate data is out of the tolerable range of the basic data, the control unit 18 controls appropriately the supplying volume from a supplying means (flow volume adjusting means 190) of the high-temperature fluid 2b. Thus, the flow rate of the high-temperature fluid 2b is controlled.

Such fluid flow rate measurement and control are applied preferably to a manufacturing process in which the temperature at fermentation, refinement, and the like of a food, cosmetic, medicine, and the like, for example is controlled properly.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

INDUSTRIAL APPLICABILITY

A measuring and controlling methods according to the present invention can be applied to an optical fiber sensing technology of BOCDA system which can measure at a high speed and a high accuracy the physical quantity such as temperature distribution, flow rate, and the like of a fluid without limiting the shape of a container through which the fluid as an object to be measured flows.

The invention claimed is:
1. A fluid physical-quantity measuring method of measuring a flow rate of a fluid that flows through a pipe line by using a BOCDA-type optical fiber sensor, said measuring method comprising the steps of:
   preparing an optical fiber whose at least part is arranged in said pipe line along a flow direction of the fluid;
   inputting pumping light from one end of said optical fiber, while inputting probe light from the other end of said optical fiber;
   measuring Brillouin gain spectrum induced at a desired position of said optical fiber in a longitudinal direction thereof, by modulating frequencies of the pumping light and probe light inputted oppositely from both ends of said optical fiber; and
   determining the flow rate of the fluid that flows through said pipe line, on the basis of a measurement result of temperature distribution along the longitudinal direction of a portion of said optical fiber which is located within said pipe line, and a temporal change of the temperature distribution.
2. A fluid physical-quantity measuring method according to claim 1, wherein a sampling interval and spatial resolution of the temperature distribution measurement along the longitudinal direction of said optical fiber, a range of the temperature distribution measurement, and an execution time of the temperature distribution measurement are set by adjusting frequency-modulation patterns of the pumping light and probe light in accordance with a kind of the fluid, which is an object to be measured.

3. A fluid physical-quantity controlling method of measuring a flow rate of a fluid that flows through a pipe line by using a BOCDA-type optical fiber sensor, and controlling the flow rate of the fluid to a predetermined value, said controlling method comprising the steps of:

preparing a flow volume adjusting means, for adjusting the flow rate of the fluid, provided to said pipe line, as well as preparing an optical fiber whose at least part is arranged along a flow direction of the fluid in said pipe line;

inputting pumping light from one end of said optical fiber, while inputting probe light from the other end of said optical fiber;

measuring Brillouin gain spectrum induced at a desired position of said optical fiber in a longitudinal direction thereof, by modulating frequencies of the pumping light and probe light inputted oppositely from both ends of said optical fiber; and controlling the flow volume adjusting means such that the flow rate of the fluid in said pipe line approaches a predetermined value, on the basis of a measurement result of temperature distribution along the longitudinal direction of a portion of said optical fiber which is located within said pipe line, and a temporal change of the temperature distribution.

4. A fluid physical-quantity controlling method according to claim 3, wherein a sampling interval and spatial resolution of the temperature distribution measurement along the longitudinal direction of said optical fiber, a range of the temperature distribution measurement, and an execution time of the temperature distribution measurement are set by adjusting frequency-modulation patterns of the pumping light and probe light in accordance with a kind of the fluid, which is an object to be measured.

* * * * *